(No Model.)
E. D. BLAKE.
SPRING WHIFFLETREE.
No. 339,522. Patented Apr. 6, 1886.
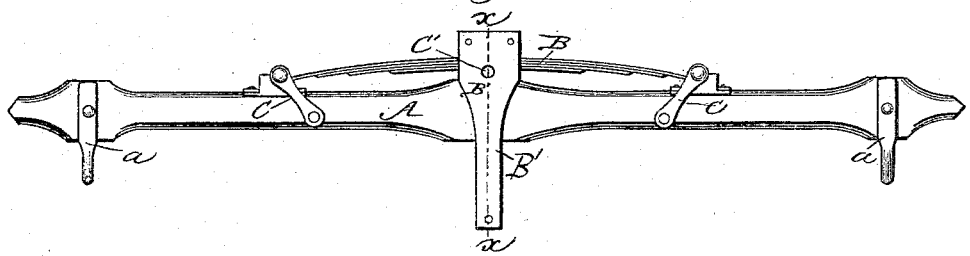
Fig. 1.
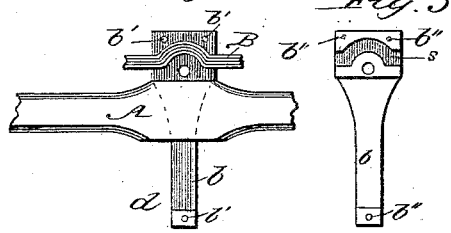 
Fig. 2. Fig. 3.
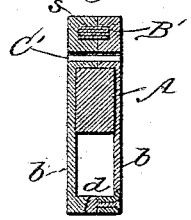
Fig. 4.
Witnesses.
W. Rossiter
Jno. H. Whipple
Inventor:
Edwin D. Blake
By Merriam & Whipple
Attys.

UNITED STATES PATENT OFFICE.

EDWIN D. BLAKE, OF CHICAGO, ILLINOIS, ASSIGNOR OF TWO-FIFTHS TO FRANK SCALES, OF SAME PLACE.

SPRING-WHIFFLETREE.

SPECIFICATION forming part of Letters Patent No. 339,522, dated April 6, 1886.

Application filed December 24, 1885. Serial No. 186,601. (No model.)

*To all whom it may concern:*

Be it known that I, EDWIN D. BLAKE, of Chicago, State of Illinois, have invented certain new and useful Improvements in Spring-Whiffletrees, of which the following is a specification.

The objects of the improvements are to make the contrivance as a whole more compact and perfect in its operation, to adapt the spring and its safety-stop to be readily applied to any common form of whiffletree, to provide means for readily connecting the spring to the safety-stop, and also means for maintaining the spring centrally on the whiffletree in operation without the employment of a guide-pin; and the invention consists in the parts and combinations hereinafter described and claimed.

The accompanying drawings illustrate a whiffletree containing the invention.

Figure 1 is a top view. Fig. 2 is a top view with a section of the safety-stop removed. Fig. 3 is a bottom view of a detached section of the safety-stop. Fig. 4 is a section taken on line $x\ x$ of Fig. 1.

A designates the whiffletree, provided with end clevises, $a\ a$, of ordinary construction. B is the spring, and B' the safety-stop. The safety-stop is made in two parts or sections, $b$ $b$, the under sections having pins or rivets $b'$ $b'$, preferably made fast therein, and the upper part having corresponding holes, $b''$ $b'''$, adapted to fit over the pins, so that they may be riveted to secure the sections together.

The spring seat or socket $s$ consists of a recess or opening corresponding with the size of the spring, and running through from side to side of the sections. The ends of the opening are in line with the general course of the spring; but in the central portion the course is varied to a shorter curve or angle, so that the spring, by having a portion bent or curved from its general course to fit or conform to the varied course of the socket, will be thereby held from slipping or being moved lengthwise in or through the socket. The spring is placed in the socket so formed before the sections are put together or when putting them together. By means of clevises $c\ c$ the ends of the spring are connected to the tree, the clevises being connected on the tree at points which are considerably nearer together than the ends of the spring are. By such arrangement the clevises are inclined outwardly from the point of their connection with the tree to their points of connection with the spring and hold the ends of the spring close against or in contact with the back part of the tree and in line with the draft-pin C'.

The clevises are pivotally connected to the tree and spring, so that they will turn inward gradually as the spring bends under tension, thereby shortening the distance between its ends until the clevises are brought at right angles to the tree. By this action the ends of the spring are carried out away from the tree and a forward yielding motion is afforded additional to that given by the spring. If the spring is permitted to yield still more after the clevises have come to a position at right angles to the tree, their tendency will be still farther toward the center, and thus to retract the spring slightly and increase its power just before the draft comes to a dead pull, resulting from the tree's reaching the limit of its movement in the slot between the sections and coming against the shoulder $d$ of the safety-stop. Another result accomplished by such arrangement and inclination of the clevises is that of preventing any lateral play of the tree through the slot of the safety-stop.

The use of guide-studs arranged on each side of the whiffletree, against the safety-stop or clevises to prevent lateral play, is thus dispensed with and a freer movement secured.

By making the safety-stop in sections it is adapted to be put onto any common form of whiffletree readily, and without being slipped over the ends or removing the end irons; also, the seat or socket for the spring may be then so formed as to hold the spring in place without other fastening, and by connecting the spring to the tree by clevises set on an incline, as shown, the draft does not come suddenly upon the spring, but yields under the action of the clevises until they are brought at right angles to the tree. The spring is not only made more compact with the tree by the inclination of the clevises, but a greater yielding motion is afforded, and the same amount of yielding motion may be obtained with a lighter spring than is usually employed. The spring is enabled to act easily under light and heavy draft, giving greater strength and durability. This position of the clevises also keeps the spring properly centered without the use of a center guide-pin, and by locating the ends of the spring about in line with the draft-pin at the start the lagging horse is given the full benefit of the spring in catching up with the foremost one, which would not be the case with the draft-pin placed out of line with the ends of the spring.

What is claimed is—

1. The spring seat or socket s, consisting of a recess or opening formed in separate sections, and having its course varied from the general course of the spring by a shorter curve or angle, in combination with the spring having a portion bent from its general course adapted to fit the varied course of the socket, as and for the purpose specified.

2. In spring-whiffletrees, the safety-stop B′, made in sections and having the spring seat or socket s, in combination with the spring B, such socket being made between the sections and having its course varied from the general course of the spring by a shorter curve or angle, and the spring also having a portion bent from its general course to fit the varied course of the socket, substantially as and for the purpose specified.

3. The whiffletree A, spring B, and safety-stop B′, in combination with clevises C C, said clevises being pivotally connected to the tree and the ends of the spring, and the points of their connection on the tree being essentially nearer together than those at the ends of the spring, substantially as and for the purpose specified.

EDWIN D. BLAKE.

Witnesses:
F. H. WOODCOCK,
JNO. H. WHIPPLE.